United States Patent
Ide et al.

(10) Patent No.: US 9,400,492 B2
(45) Date of Patent: Jul. 26, 2016

(54) MOTOR CONTROL DEVICE

(71) Applicants: Yuji Ide, Tokyo (JP); Michio Kitahara, Tokyo (JP); Satoshi Yamazaki, Tokyo (JP)

(72) Inventors: Yuji Ide, Tokyo (JP); Michio Kitahara, Tokyo (JP); Satoshi Yamazaki, Tokyo (JP)

(73) Assignee: Sanyo Denki Co., Ltd., Tokyo (JP)

( * ) Notice: Subject to any disclaimer, the term of this patent is extended or adjusted under 35 U.S.C. 154(b) by 76 days.

(21) Appl. No.: 14/326,831

(22) Filed: Jul. 9, 2014

(65) Prior Publication Data
US 2015/0015173 A1 Jan. 15, 2015

(30) Foreign Application Priority Data
Jul. 9, 2013 (JP) ................. 2013-143410

(51) Int. Cl.
*H02P 23/04* (2006.01)
*H02P 29/00* (2016.01)
*G05B 13/04* (2006.01)
(52) U.S. Cl.
CPC ...... *G05B 13/04* (2013.01); *G05B 2219/42095* (2013.01)
(58) Field of Classification Search
CPC .................................. G05B 13/04

USPC ......... 318/560, 561, 565, 575, 590, 621, 623, 318/626, 628
See application file for complete search history.

(56) References Cited

U.S. PATENT DOCUMENTS

| | | | | |
|---|---|---|---|---|
| 5,517,097 A | * | 5/1996 | Hayashida | G05B 19/19 318/568.22 |
| 5,745,361 A | * | 4/1998 | Kim | G05B 13/0275 700/43 |
| 7,366,576 B2 | * | 4/2008 | Tanahashi | G05B 19/19 700/188 |
| 2010/0060226 A1 | | 3/2010 | Ide | |

FOREIGN PATENT DOCUMENTS

| | | |
|---|---|---|
| JP | 2005198404 A | 7/2005 |
| JP | 2010041734 A | 2/2010 |

* cited by examiner

*Primary Examiner* — Bentsu Ro
(74) *Attorney, Agent, or Firm* — Drinker Biddle & Reath LLP (57) ABSTRACT

A motor control device includes a model control system that controls a motor machine model position using a target value (a position instruction after differentiation) related to a position instruction, and a feedback control system that controls a motor position using the target value (a position instruction after differentiation) related to the position instruction and an amount of control (model position) of the model control system. The feedback control system controls the motor position using the amount of control (model position) of the model control system at all times.

22 Claims, 3 Drawing Sheets

MOTOR CONTROL DEVICE

CROSS-REFERENCE TO RELATED APPLICATIONS

This application claims benefit of Japanese Application No. 2013-143410, filed Jul. 9, 2013, which is incorporated herein by reference in its entirety.

BACKGROUND

1. Technical Field

The present invention relates to a motor control device that can shorten a cycle time of a machine.

2. Description of Related Art

In a machine such as a machine tool which performs processing, not only an improvement of a processing quality but also a shortening of a cycle time is required. In order to shorten the cycle time, it is necessary to reduce a processing time by improving a tracking performance at the time of processing, and to quickly return to the original position by a speedup of the positioning when the processing is finished.

The tracking performance at the time of processing is improved by increasing a feedback control gain. On the other hand, the speedup of the positioning when the processing is finished is realized by a control in which a rigidity of the machine is taken into consideration.

In many cases, when the positioning is performed at a high speed, a vibration occurs due to the lack of the rigidity of the machine. For this reason, a vibration controller is mounted on the motor control device, which can shorten a setting time of the positioning by suppressing the vibration of the machine.

Japanese Unexamined Patent Application Publication No. 2010-41734 is disclosed as a technology that realizes the speedup of the positioning by the vibration control. In the technology disclosed in Japanese Unexamined Patent Application Publication No. 2010-41734, using a machine base model, a vibration control is performed in the model control system side so that the vibration of the machine is suppressed, and an instruction for suppressing the vibration is provided to the feedback control system side from the model control system side.

However, since phase characteristics of the model control system are not linear, it is not possible to use the model control system at the time of trajectory control such as in the processing. Therefore, at the time of trajectory control, the feedback control system is used while the model control system is not used.

In order to shorten the cycle time of the machine in the technology disclosed in Japanese Unexamined Patent Application Publication No. 2010-41734, it is necessary to switch the model control system and the feedback control system to the time of trajectory control and the time of positioning control. However, even though the control system is quickly switched, there is a possibility of occurrence of a position shift in the positioning of the feedback control system due to the control delay in the model control system.

The reason for the above is because an amount of model position change output from the model control system is the position instruction in the feedback control system, but even though an amount of position instruction change to the model control system becomes zero, the amount of model position change does not become zero quickly. When the model control system is switched to the feedback control system in a state in which the amount of model position change remains, the remaining portion of the amount of model position change becomes the amount of position shift in the feedback control system. Particularly, in a case where the vibrational frequency of the vibration is low, since a gain in the model control system cannot be high, it takes a considerable amount of time until the model position shift becomes zero.

Therefore, in the related art, in order to avoid the position shift in the feedback control system, the control system has to be switched from the model control system to the feedback control system after the amount of change of the model position becomes zero, and thus, it is not possible to speedup the switching of the control system.

Japanese Unexamined Patent Application Publication No. 2005-198404 discloses a technology by which the switching of the control system can be realized. The technology disclosed in Japanese Unexamined Patent Application Publication No. 2005-198404 includes an identification unit that identifies the model of a control target by identifying characteristics of the control target, and a controller selection unit that outputs a selection signal based on the identified model. One feed-forward controller is selected from a plurality of feed-forward controllers and a position instruction is input to the selected feed-forward controller. One feedback controller is selected from a plurality of feedback controllers by a selection signal and a feed-forward signal and a position detection signal are input to the selected feedback controller, and the torque instruction is output. A current control is performed using the torque instruction and the control target is operated by driving the motor.

SUMMARY

However, in the technology disclosed in Japanese Unexamined Patent Application Publication No. 2005-198404, the control is performed by selecting the feed-forward controller and the feedback controller based on the identification result of the characteristics of the control target. However, the control in which the feed-forward controller and the feedback controller are switched in real time is not performed.

For this reason, even in the technology disclosed in Japanese Unexamined Patent Application Publication No. 2005-198404, it is not possible to use the controllers by switching the feed-forward controller and the feedback controller at a high speed.

The present invention provides a motor control device that can switch the control which uses a model and the control which does not use a model at a high speed, and that can shorten a cycle time of a machine.

Furthermore, the present invention provides a motor control device in which an operation of a motor is smooth and a position shift does not occur even though the control which uses a model and the control which does not use a model are switched at a high speed.

A motor control device according to the present invention includes a model control system and a feedback control system. The model control system controls a model position using a target value related to a position instruction. The feedback control system controls a motor position using the target value related to the position instruction and an amount of control of the model control system. The feedback control system controls the motor position using the amount of control of the model control system at all times.

According to the motor control device in the present invention, since the feedback control system controls the motor position using the amount of control of the model control system at all times, the model control system and the feedback control system can be switched at a high speed, and thus, it is possible to shorten the cycle time of the machine.

DETAILED DESCRIPTION

Hereinafter, the embodiments of the motor control device according to the present invention will be described separately in Embodiment 1 to Embodiment 3.

Embodiment 1

Configuration of Motor Control Device 100

Figure 1:
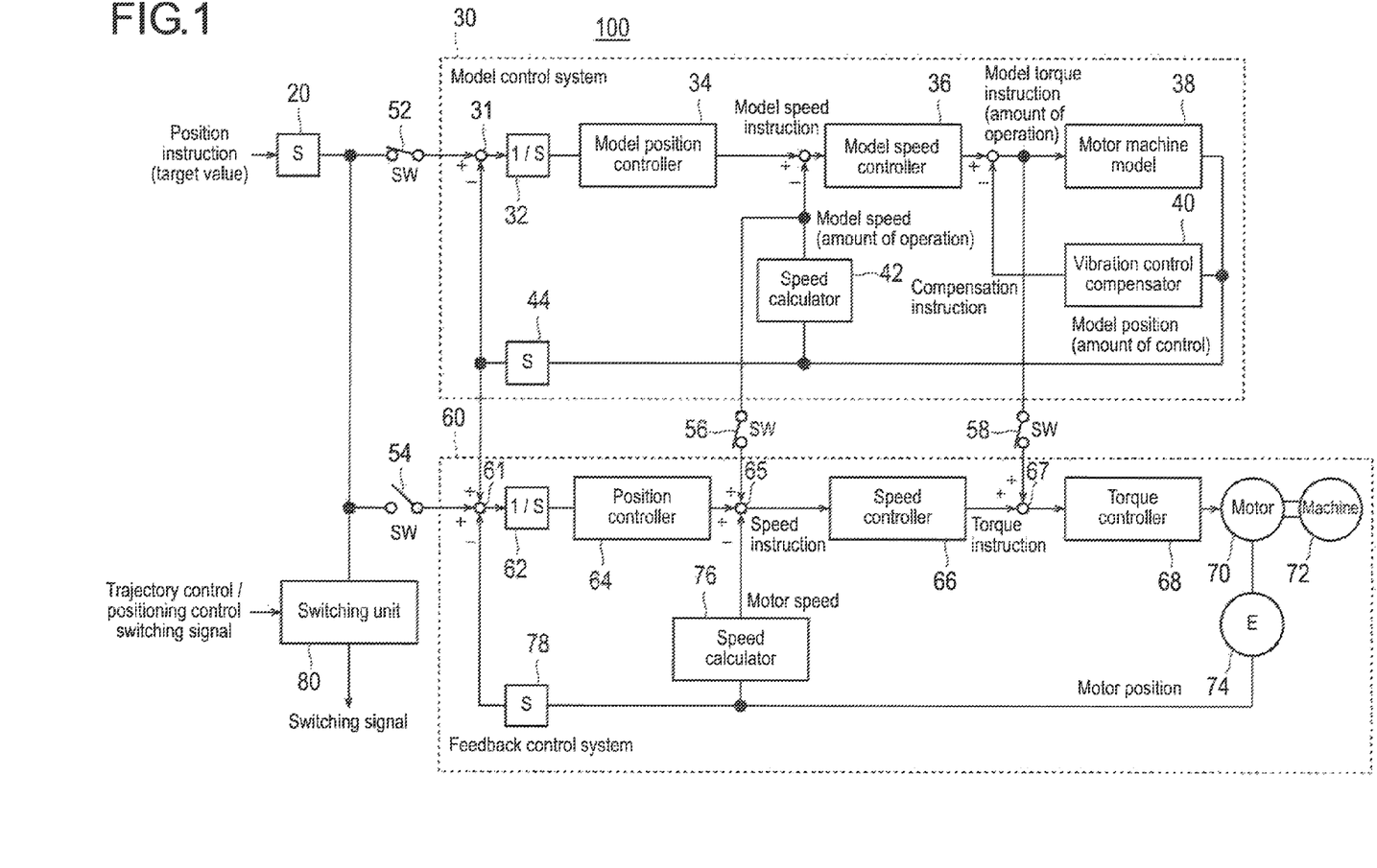
FIG. 1 is a configuration diagram of a motor control device in Embodiment 1.

FIG. 1 is a configuration diagram of a motor control device according to embodiment 1. The motor control device 100 includes a model control system 30 and a feedback control system 60. The model control system 30 controls a model position using a target value related to a position instruction. The feedback control system 60 controls a motor position using the target value related to a position instruction and an amount of control of the model control system 30. The feedback control system 60 controls the motor position using an amount of control of the model control system 30 at all times. Regarding the target value related to the position instruction, the position instruction after the differentiation is indicated in FIG. 1, but not limited thereto, and an instruction after another processing is included. In addition, regarding the amount of control of the model control system 30, the model position is indicated in FIG. 1, but not limited thereto.

The model control system 30 includes an integrator 32, a model position controller 34, a model speed controller 36, a motor machine model 38, a vibration control compensator 40, a speed calculator 42, and a differentiator 44. In addition, feedback control system 60 includes an integrator 62, a position controller 64, a speed controller 66, a torque controller 68, a motor 70, a machine 72, an encoder 74, a speed calculator 76, and a differentiator 78.

The integrator 32 integrates the input instruction related to the position (a deviation between a position instruction differentiated by the differentiator 20 and the model position differentiated by the differentiator 44). The model position controller 34 outputs a model speed instruction from the instruction after the integration which is output from the integrator 32. The model speed controller 36 outputs a model torque instruction which is an amount of operation, from the input instruction related to the speed (a deviation between the model speed instruction and the model speed which is an amount of operation output from the speed calculator 42). The motor machine model 38 outputs a model position from the model torque instruction. The motor machine model 38 is a model in which inertia of the motor 70 and the machine 72 are modeled.

The vibration control compensator 40 feeds a compensation instruction output from the model position back to the output unit of the model speed controller 36 in order to suppress a vibration of the machine 72. The speed calculator 42 outputs the model speed from the model position. The differentiator 44 differentiates the model position and feeds the model position back to the integrator 32, and adds the model position to the instruction related to the position input to the integrator 62.

The integrator 62 integrates the deviation between the instruction related to the input position (the position instruction differentiated by the differentiator 20 and the model position differentiated by the differentiator 44) and the motor position differentiated by the differentiator 78 (output from the encoder 74). The position controller 64 outputs a speed instruction from the deviation after the integration output from the integrator 62. The speed controller 66 outputs a torque instruction from the deviation between the input instruction related to the speed (the model speed from the model control system 30 and the speed instruction from the position controller 64) and a motor speed from the speed calculator 76. The torque controller 68 outputs a drive power of the motor 70 from the model torque instruction from the model control system 30 and the torque instruction from the speed controller 66.

The motor 70 drives the components of the machine 72. The encoder 74 outputs the motor position from a detected rotation position of the motor 70. The speed calculator 76 outputs the motor speed from the motor position. The differentiator 78 differentiates the motor position.

A first switch 52 is provided between the differentiator 20 and a subtractor 31. A second switch 54 is provided between the differentiator 20 and an adder and subtractor 61. A third switch 56 is provided between the output side of the speed calculator 42 and an adder and subtractor 65. A fourth switch 58 is provided between the input side of the motor machine model 38 and the input side of an adder 67.

The first switch 52 provides the model control system 30 with the input instruction (target value) related to the position. The second switch 54 provides the feedback control system 60 with the input instruction (target value) related to the position. The third switch 56 provides the feedback control system 60 with the model speed which is the amount of operation. The fourth switch 58 provides the feedback control system 60 with the model torque instruction which is the amount of operation.

The first to fourth switches 52, 54, 56, and 58 are switched ON and OFF when the machine 72 is positioning controlled and is trajectory controlled. When the machine 72 is positioning controlled, the first switch 52, the third switch 56, and the fourth switch 58 are in ON position, and the second switch 54 is in OFF position. When the machine 72 is trajectory controlled, the first switches 52, the third switch 56, and the fourth switch 58 are in OFF position, and the second switch 54 is in ON position.

A switching signal for switching the trajectory control and the positioning control is output from the control device of the machine to a switching unit 80. The switching unit 80 switches the ON and OFF of the first to fourth switches 52, 54, 56, and 58 when the trajectory control switching signal is output from the machine 72 (at the time of trajectory control) and when the positioning control switching signal (at the time of positioning control) is output. In addition, the switching unit 80 inputs the trajectory control switching signal and the positioning control switching signal before the target value related to the position instruction reaches a specified value (for example, zero), and switches the ON and OFF of the first switch 52 and the second switch 54 when the target value related to the position instruction reaches the specified value.

Specifically, when the machine 72 is in positioning control, the switching unit 80 makes the first switch 52, the third switch 56, and the fourth switch 58 ON and the second switch 54 OFF in such a manner that the feedback control system 60 can control the position of the motor 70 using the model position of the model control system 30. In addition, when the machine 72 is in trajectory control, the switching unit 80 makes the first switch 52, the third switch 56, and the fourth switch 58 OFF and the second switch 54 ON in such a manner that the feedback control system 60 can control the position of the motor 70 using the position instruction after the differentiation and the model position of the model control system 30.

Operation of Motor Control Device 100

First, a case where the machine 72 is in positioning control will be described. When the machine 72 is positioning controlled, the positioning control switching signal is output from the control device of the machine 72 to the switching unit 80, and as illustrated in FIG. 1, the first switch 52, the third switch 56, and the fourth switch 58 are made to be ON by the switching signal output from the switching unit 80, and the second switch 54 is made to be OFF. That is, when the machine 72 is in positioning control, the switching unit 80 causes the model control system 30 to operate, thus, the model position, the model speed, and the model torque instruction from the model control system 30 are used in the feedback control system 60.

In the model control system 30, the position instruction differentiated in the differentiator 20 is input as a differentiated position instruction via the first switch 52. The deviation between the differentiated position instruction and the model position differentiated in the differentiator 44 is integrated in the integrator 32, and the model speed instruction is output from the model position controller 34. The deviation between the model speed instruction and the model speed calculated by the speed calculator 42 using the model position is input to the model speed controller 36, and the model torque instruction is output from the model speed controller 36. The deviation between the model torque instruction and the compensation instruction calculated in the vibration control compensator 40 using the model position is input to the motor machine model 38, and the model position is output from the motor machine model 38.

The vibration control compensator 40 calculates the compensation instruction from the model position, and outputs the compensation instruction for canceling the vibration of the motor machine model 38. The speed calculator 42 calculates the model speed from the model position. The differentiator 44 differentiates the model position.

In the feedback control system 60, the deviation between the model position differentiated by the differentiator 44 of the model control system 30 and the motor position differentiated by the differentiator 78 of the feedback control system 60 is integrated by the integrator 62, and the speed instruction is output from the position controller 64. The deviation between the speed instruction output from the position controller 64, the model speed input via the third switch 56, which is the amount of operation of the model control system 30, and the motor speed calculated by the speed calculator 76 using the motor position is input to the speed controller 66, and the torque instruction is output. The model torque instruction input via the fourth switch 58, which is the amount of operation of the model control system 30 and the torque instruction output from the speed controller 66 are added to be input to the torque controller 68. The torque controller 68 outputs the drive power for the motor 70, and the motor 70 drives the components of the machine 72.

The motor position (rotation position) of the motor 70 is detected by the encoder 74. The speed calculator 76 calculates the motor speed from the motor position. The differentiator 78 differentiates the motor position.

As described above, when the machine 72 is positioning controlled, since the first switch 52, the third switch 56, and the fourth switch 58 are made to be ON, the model position after the differentiation, the model speed, and the model torque instruction of the model control system 30 is provided to the feedback control system 60. The feedback control system 60 performs the positioning control (model following control) of the motor 70 using the amount of operation and the amount of control from the model control system 30. Particularly, since the model position after differentiation from the model control system 30 does not pass the switch, and thus, is provided at all times to the feedback control system 60.

Next, a case of trajectory control of the machine 72 will be described. When the machine 72 is trajectory controlled, the trajectory control switching signal is output from the control device of the machine 72 to the switching unit 80, contrary to the case of positioning control, the first switch 52, the third switch 56, and the fourth switch 58 are made to be OFF, and the second switch 54 is made to be ON. Therefore, when the machine 72 is trajectory controlled, only the model position after differentiation is provided to the feedback control system 60 from the model control system 30.

In the feedback control system 60, the position instruction differentiated by the differentiator 20 is input as a differentiated position instruction via the second switch 54. The deviation between the differentiated position instruction, the model position differentiated by the differentiator 44, and the motor position differentiated by the differentiator 78 is integrated by the integrator 62, and the speed instruction is output from the position controller 64. The deviation between the speed instruction output from the position controller 64 and the motor speed calculated by the speed calculator 76 using the motor position is input to the speed controller 66, and the torque instruction is output. The torque controller 68 outputs the drive power for the motor 70 from the torque instruction and the motor 70 drives the components of the machine 72.

The encoder 74 detects the motor position of the motor 70 and outputs the detection result to the speed calculator 76 and the differentiator 78. The speed calculator 76 outputs the motor speed from the motor position. The differentiator 78 differentiates the motor position.

When the machine 72 is positioning controlled, the motor control device 100 according to Embodiment 1 causes the first switch 52, the third switch 56, and the fourth switch 58 to be ON, and the second switch 54 to be OFF, and when the machine 72 is trajectory controlled, causes the first switch 52, the third switch 56, and the fourth switch 58 to be OFF, and the second switch 54 to be ON. The timing of the ON and OFF switching of the first to fourth switches 52, 54, 56, and 58 is the time when the differentiated position instruction (target value) which is position instruction differentiated becomes zero (specified value).

The operation of ON and OFF switching of the first to fourth switches 52, 54, 56, and 58 and recognizing whether the differentiated position instruction becomes zero or not is performed by the switching unit 80. When the positioning control is shifted to the trajectory control, the motor control device 100 switches the first switch 52, the third switch 56, and the fourth switch 58 to be OFF from ON, and the second switch 54 to be ON from OFF when the differentiated position instruction becomes zero. The recognition of whether the differentiated position instruction becomes zero or not may be performed in the controller side of the machine. In such a case, the function of determining whether the differentiated position instruction becomes zero or not is not necessary for the switching unit 80.

In the motor control device 100, at any time of the positioning control or the trajectory control, the model position of the model control system 30 after differentiation is provided to the feedback control system 60. Therefore, when the positioning control of the machine 72 is shifted to the trajectory control, even though the model control system 30 is switched to the feedback control system 60, since the model position due to the control delay of the model control system 30 is carried over to the feedback control system 60, the position shift of the motor position of the motor 70 does not occur.

In addition, when the trajectory control is shifted to the positioning control, the position shift of the position of motor 70 does not occur.

As described above, according to the motor control device 100 in Embodiment 1, the feedback control system 60 controls the position of the machine 72 using the model position of the model control system 30 at all times. Accordingly, the model control system 30 and the feedback control system 60 can be switched at a high speed, and thus, it is possible to shorten the cycle time of the machine. In addition, even though the model control system 30 and the feedback control system 60 are switched at a high speed, the operation of the position of the motor 70 is smooth, and thus, the position shift of the motor position does not occur.

Embodiment 2

Configuration of Motor Control Device 200

Figure 2:
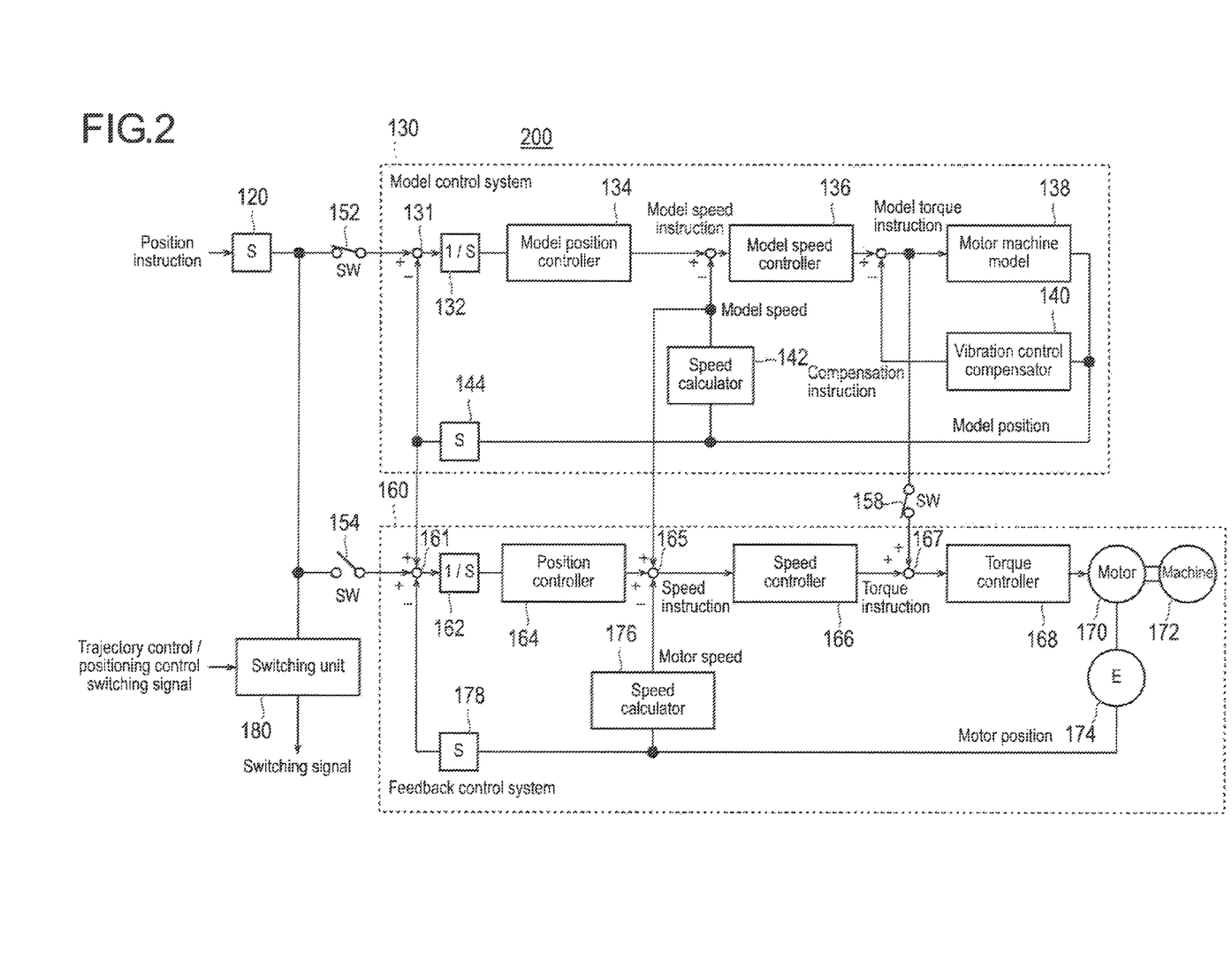
FIG. 2 is a configuration diagram of a motor control device in Embodiment 2.

FIG. 2 is a configuration diagram of a motor control device according to Embodiment 2. The motor control device 200 includes a model control system 130 and a feedback control system 160.

The model control system 130 includes an integrator 132, a model position controller 134, a model speed controller 136, a motor machine model 138, a vibration control compensator 140, a speed calculator 142, and a differentiator 144. In addition, the feedback control system 160 includes an integrator 162, a position controller 164, a speed controller 166, a torque controller 168, a motor 170, a machine 172, an encoder 174, a speed calculator 176, and a differentiator 178.

The integrator 132, the model position controller 134, the model speed controller 136, the motor machine model 138, the vibration control compensator 140, the speed calculator 142, and the differentiator 144 in the motor control device 200 are the same as the integrator 32, the model position controller 34, the model speed controller 36, the motor machine model 38, the vibration control compensator 40, the speed calculator 42, and the differentiator 44 in the motor control device 100 in Embodiment 1. In addition, the integrator 162, the position controller 164, the speed controller 166, the torque controller 168, the motor 170, the machine 172, the encoder 174, the speed calculator 176, and the differentiator 178 in the motor control device 200 are the same as the integrator 62, the position controller 64, the speed controller 66, the torque controller 68, the motor 70, the machine 72, the encoder 74, the speed calculator 76, and the differentiator 78 in the motor control device 100 in Embodiment 1.

The only difference in the configuration of the motor control device 200 from the configuration of the motor control device 100 in Embodiment 1 is that the model speed which is the amount of operation of the model control system 130 is provided to the feedback control system 160 at all times.

Operation of Motor Control Device 200

An operation of the motor control device 200 is almost the same as the operation of the motor control device 100 in Embodiment 1. In the motor control device 200 also, a model position of the model control system 130 after differentiation is provided to the feedback control system 160 at all times. Therefore, when a positioning control of the machine 172 is shifted to a trajectory control, even though the model control system 130 is switched to the feedback control system 160 at a high speed, since the model position due to the control delay of the model control system 130 is carried over to the feedback control system 160, the position shift of the motor position of the motor 170 does not occur.

In addition, in the motor control device 200, the model speed from the model control system 130 is also provided to the feedback control system 160 at all times. Therefore, when the positioning control of the machine 172 is shifted to the trajectory control, even though the model control system 130 is switched to the feedback control system 160, since the model speed due to the control delay of the model control system 130 is carried over to the feedback control system 160, the operation of the speed of the feedback control system 160 by the switching becomes smooth without a rapid change of the speed instruction.

Embodiment 3

Configuration of Motor Control Device 300

Figure 3:
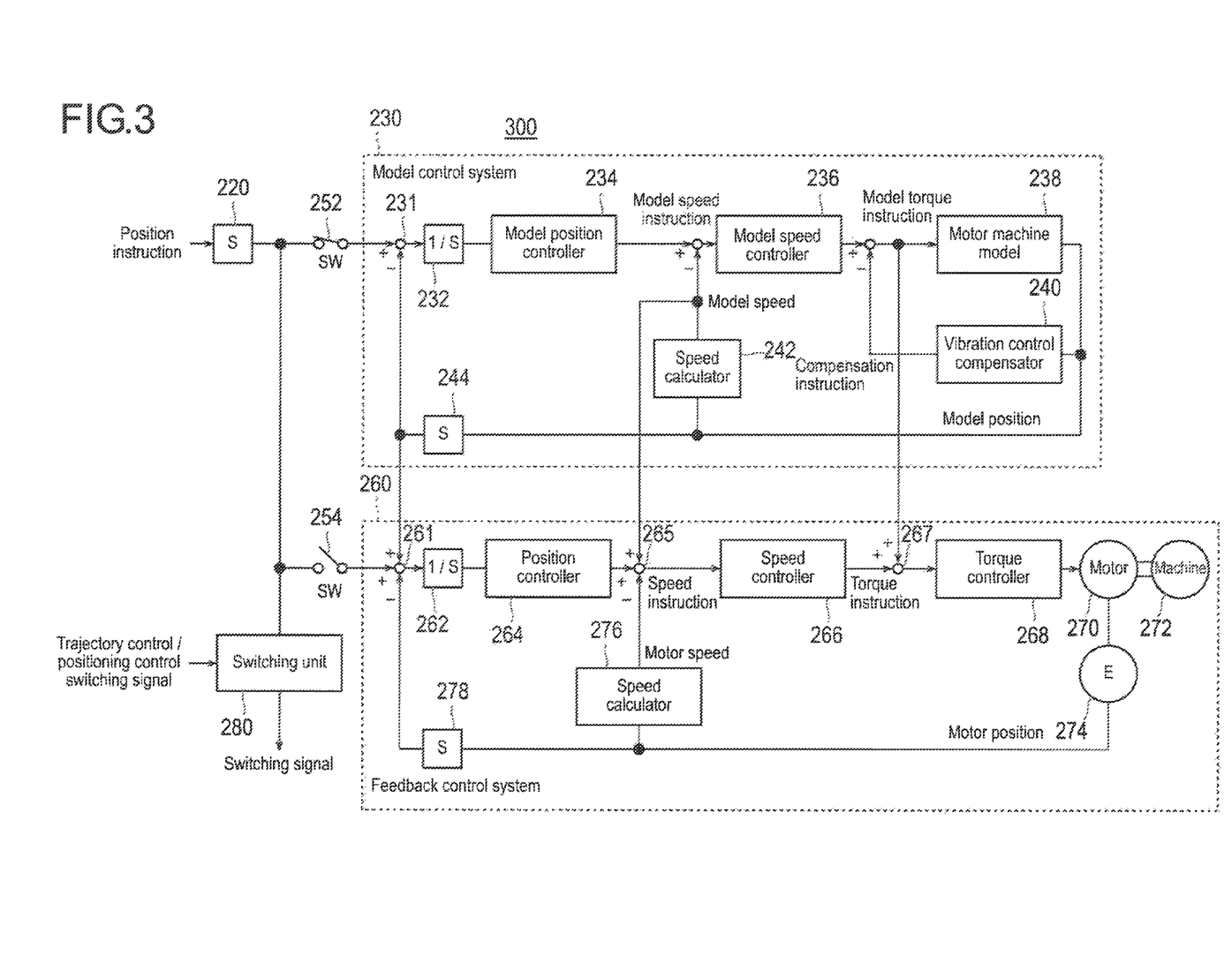
FIG. 3 is a configuration diagram of a motor control device in Embodiment 3.

FIG. 3 is a configuration diagram of a motor control device according to Embodiment 3. The motor control device 300 includes a model control system 230 and a feedback control system 260.

The model control system 230 includes an integrator 232, a model position controller 234, a model speed controller 236, a motor machine model 238, a vibration control compensator 240, a speed calculator 242, and a differentiator 244. In addition, the feedback control system 260 includes an integrator 262, a position controller 264, a speed controller 266, a torque controller 268, a motor 270, a machine 272, an encoder 274, a speed calculator 276, and a differentiator 278.

The integrator 232, the model position controller 234, the model speed controller 236, the motor machine model 238, the vibration control compensator 240, the speed calculator 242, and the differentiator 244 in the motor control device 300 are the same as the integrator 32, the model position controller 34, the model speed controller 36, the motor machine model 38, the vibration control compensator 40, the speed calculator 42, and the differentiator 44 in the motor control device 100 in Embodiment 1. In addition, the integrator 262, the position controller 264, the speed controller 266, the torque controller 268, the motor 270, the machine 272, the encoder 274, the speed calculator 276, and the differentiator 278 in the motor control device 300 are the same as the integrator 62, the position controller 64, the speed controller 66, the torque controller 68, the motor 70, the machine 72, the encoder 74, the speed calculator 76, and the differentiator 78 in the motor control device 100 in Embodiment 1.

The difference between the configuration of the motor control device 300 and the configuration of the motor control device 100 according to embodiment 1 is that the model speed and the model torque instruction which are the amount of operation of the model control system 230 is input to the feedback control system 260 at all times.

Operation of Motor Control Device 300

An operation of the motor control device 300 is almost the same as the operation of the motor control device 100 in Embodiment 1. In the motor control device 300 also, a model position of the model control system 230 after differentiation is provided to the feedback control system 260 at all times. Therefore, when a positioning control of the machine 272 is shifted to a trajectory control, even though the model control system 230 is switched to the feedback control system 260, since the model position due to the control delay of the model control system 230 is carried over to the feedback control system 260, the position shift of the motor position of the motor 270 does not occur.

In addition, in the motor control device 300, the model speed from the model control system 230 is also provided to the feedback control system 260 at all times. Therefore, when the positioning control of the machine 272 is shifted to the trajectory control, even though the model control system 230 is switched to the feedback control system 260, since the model speed due to the control delay of the model control system 230 is carried over to the feedback control system 260, the operation of the speed of the feedback control system 260 by the switching becomes smooth without a rapid change of the speed instruction.

Furthermore, in the motor control device 300, the model torque instruction from the model control system 230 is also provided to the feedback control system 260 at all times. Therefore, when the positioning control of the machine 272 is shifted to the trajectory control, even though the model control system 230 is switched to the feedback control system 260, since the model torque instruction due to the control delay of the model control system 230 is carried over to the feedback control system 260, the operation of the torque of the feedback control system 260 by the switching becomes smooth without a rapid change of the torque instruction.

As described above, in the motor control device 300 in Embodiment 3, the control in which the model is used and the control device in which the model is not used can be and even when being switched at a high speed, the operation of the motor is smooth, and thus, it is possible to shorten the cycle time of the machine.

In the three embodiments described above, the motor control device of the type in which the model speed or the model torque is output to the feedback control system from the model control system is exemplified. However, the present invention can be applied to a motor control device of a type in which the speed instruction based on the model speed or the torque instruction based on the model torque is not output to the feedback control system from the model control system.

In addition, the present invention can also be applied to a device which is made from a differentiator, a proportional gain, and a low pass filter (LPF) and which performs the feed-forward compensation on the model speed instruction or the model torque instruction from the position instruction or the differentiated position instruction added to the model control system.

Furthermore, the present invention can also be applied to a device which is made from a differentiator, a proportional gain, and a low pass filter (LPF) and which performs the feed-forward compensation on the speed instruction or the torque instruction of the feedback control system from the position instruction or the differentiated position instruction added to the feedback control system.

In addition, when a discharge of each instruction from the model control system to the feedback control system is finished, each instruction from the model control system may be cut using a cutoff device such as a switch.

In this way, in the motor control device in the related art, if the model control system and the feedback control system are switched at a high speed, since the position shift of the machine or the rapid change in the speed or the torque occurs, it is not possible to switch the model control system and the feedback control system at a high speed. However, according to the present invention, in a case where the feedback control is performed, the discharged portion of the model instruction remaining due to the delay in response of the model control system can be shifted to the feedback control system. For this reason, the model control system is switched to the feedback control system immediately after the amount of change of the position instruction becomes zero, and thus, it is possible to shorten the cycle time of the machine.

The present application is based on the Japanese Patent Application No. 2013-143410 filed on Jul. 9, 2013, the disclosure content thereof is referenced here and made a part of hereof as a whole.

What is claimed is:

1. A motor control device comprising:
   a model control system that controls a model position using a target value related to a position instruction; and
   a feedback control system that controls a motor position to set the motor position to a position indicated by the target value related to the position instruction,
   wherein the feedback control system makes the amount of control of the model control system to be added status at all times, and
   the motor is controlled by switching between the model control system and the feedback control system.

2. The motor control device according to claim 1, further comprising:
   a first switch that provides the model control system with the target value related to the position instruction;
   a second switch that provides the feedback control system with the target value related to the position instruction; and
   a switching unit that switches an ON and OFF of the first switch and the second switch when the target value related to the position instruction reaches a specified value.

3. The motor control device according to claim 2,
   wherein, when the motor is in positioning control, the switching unit makes the first switch ON and the second switch OFF such that the feedback control system can control the motor position using the amount of control of the model control system, and
   wherein, when the machine is in trajectory control, the switching unit makes the first switch OFF and the second switch ON such that the feedback control system can control the motor position using the target value related to the position instruction and the amount of control of the model control system.

4. The motor control device according to claim 3,
   wherein the switching unit outputs a switching signal that switches the ON and OFF of the first switch and the second switch using a trajectory control switching signal or a positioning control switching signal input from the machine.

5. The motor control device according to claim 4,
   wherein, before the target value related to the position instruction reaches a specified value, the switching unit inputs the trajectory control switching signal or the positioning control switching signal, and when the target value related to the position instruction reaches the specified value, the switching unit switches the ON and OFF of the first switch and the second switch.

6. A motor control device comprising:
   a model control system that controls a model position using a target value related to a position instruction; and
   a feedback control system that controls a motor position to set the motor position to a position indicated by the target value related to the position instruction, wherein the feedback control system makes the amount of operation and the amount of control of the model control system to be added status at all times, and the motor is controlled by switching between the model control system and the feedback control system.

7. The motor control device according to claim 6, further comprising:

a first switch that provides the model control system with the target value related to the position instruction;

a second switch that provides the feedback control system with the target value related to the position instruction; and a switching unit that switches an ON and OFF of the first switch and the second switch when the target value related to the position instruction reaches a specified value.

8. The motor control device according to claim 7, wherein, when the motor is in positioning control, the switching unit makes the first switch ON and the second switch OFF such that the feedback control system can control the motor position using the amount of control of the model control system, and wherein, when the machine is in trajectory control, the switching unit makes the first switch OFF and the second switch ON such that the feedback control system can control the motor position using the target value related to the position instruction and the amount of control of the model control system.

9. The motor control device according to claim 6, wherein the amount of operation of the model control system is a model speed, or a model speed and a model torque instruction.

10. The motor control device according to claim 8, wherein the switching unit outputs a switching signal that switches the ON and OFF of the first switch and the second switch using a trajectory control switching signal or a positioning control switching signal input from the machine.

11. The motor control device according to claim 10, wherein, before the target value related to the position instruction reaches a specified value, the switching unit inputs the trajectory control switching signal or the positioning control switching signal, and when the target value related to the position instruction reaches the specified value, the switching unit switches the ON and OFF of the first switch and the second switch.

12. A motor control device comprising:

a model control system that controls a model position using a target value related to a position instruction; and a feedback control system that controls a motor position to set the motor position to a position indicated by the target value related to the position instruction, wherein the feedback control system makes the amount of control of the model control system to be added at least while the amount of control of the model control system has an effective value, and the motor is controlled by switching between the model control system and the feedback control system.

13. The motor control device according to claim 12, further comprising:

a first switch that provides the model control system with the target value related to the position instruction;

a second switch that provides the feedback control system with the target value related to the position instruction; and a switching unit that switches an ON and OFF of the first switch and the second switch when the target value related to the position instruction reaches a specified value.

14. The motor control device according to claim 13, wherein, when the motor is in positioning control, the switching unit makes the first switch ON and the second switch OFF such that the feedback control system can control the motor position using the amount of control of the model control system, and wherein, when the machine is in trajectory control, the switching unit makes the first switch OFF and the second switch ON such that the feedback control system can control the motor position using the target value related to the position instruction and the amount of control of the model control system.

15. The motor control device according to claim 14, wherein the switching unit outputs a switching signal that switches the ON and OFF of the first switch and the second switch using a trajectory control switching signal or a positioning control switching signal input from the machine.

16. The motor control device according to claim 15, wherein, before the target value related to the position instruction reaches a specified value, the switching unit inputs the trajectory control switching signal or the positioning control switching signal, and when the target value related to the position instruction reaches the specified value, the switching unit switches the ON and OFF of the first switch and the second switch.

17. A motor control device comprising:

a model control system that controls a model position using a target value related to a position instruction; and a feedback control system that controls a motor position to set the motor position to a position indicated by the target value related to the position instruction, wherein the feedback control system makes the amount of operation of the model control system to be added at least while the amount of operation of the model control system has an effective value, and makes the amount of control of the model control system to be added at least while the amount of control of the model control system has an effective value, and the motor is controlled by switching between the model control system and the feedback control system.

18. The motor control device according to claim 17, further comprising:

a first switch that provides the model control system with the target value related to the position instruction;

a second switch that provides the feedback control system with the target value related to the position instruction; and a switching unit that switches an ON and OFF of the first switch and the second switch when the target value related to the position instruction reaches a specified value.

19. The motor control device according to claim 18, wherein, when the motor is in positioning control, the switching unit makes the first switch ON and the second switch OFF such that the feedback control system can control the motor position using the amount of control of the model control system, and wherein, when the machine is in trajectory control, the switching unit makes the first switch OFF and the second switch ON such that the feedback control system can control the motor position using the target value related to the position instruction and the amount of control of the model control system.

20. The motor control device according to claim 17, wherein the amount of operation of the model control system is a model speed, or a model speed and a model torque instruction.

21. The motor control device according to claim 19, wherein the switching unit outputs a switching signal that switches the ON and OFF of the first switch and the second switch using a trajectory control switching signal or a positioning control switching signal input from the machine.

22. The motor control device according to claim 21, wherein, before the target value related to the position instruction reaches a specified value, the switching unit inputs the trajectory control switching signal or the positioning control switching signal, and when the target value related to the position instruction reaches the specified value, the switching unit switches the ON and OFF of the first switch and the second switch.

* * * * *